Jan. 6, 1959 W. E. WHITE 2,867,297
BRAKE
Filed Dec. 28, 1953 5 Sheets-Sheet 1

INVENTOR
WILLIAM E. WHITE
BY Cecil J. Arens
ATTORNEY

Jan. 6, 1959

W. E. WHITE 2,867,297

BRAKE

Filed Dec. 28, 1953

INVENTOR.
WILLIAM E. WHITE
BY Cecil J Arens

ATTORNEY

INVENTOR.
WILLIAM E. WHITE
BY Cecil J Arens

ATTORNEY

Jan. 6, 1959 W. E. WHITE 2,867,297
BRAKE
Filed Dec. 28, 1953 5 Sheets-Sheet 4

INVENTOR.
WILLIAM E. WHITE
BY Cecil J Arena
ATTORNEY

Jan. 6, 1959   W. E. WHITE   2,867,297
BRAKE
Filed Dec. 28, 1953   5 Sheets-Sheet 5

INVENTOR.
WILLIAM E. WHITE
BY
ATTORNEY

United States Patent Office 2,867,297
Patented Jan. 6, 1959

2,867,297

BRAKE

William Edward White, Buchanan, Mich., assignor to Bendix Aviation Corporation, South Bend, Ind., a corporation of Delaware Application December 28, 1953, Serial No. 400,428

12 Claims. (Cl. 188—78)

This invention relates to brakes and more particularly to an internally expanding shoe brake wherein each of the shoes is individually self-energized in either direction of vehicle motion. This brake is especially adaptable for use in high kinetic energy absorbing applications, such as trailer braking.

The braking art has extensively utilized pneumatically actuated brakes for heavy duty applications. While pneumatically controlled brakes have been satisfactory in some respect, they are seriously deficient in the matter of pedal travel required for actuation and controllability of braking effectiveness. The present invention proposes to eliminate such devices as pneumatically actuated linkages which are used to mechanically apply the brake, and substitute therefor a hydraulic system for applying the friction elements of the brake mechanism. Ruggedness and reliability in operation are prime requisites in the heavy duty brake constituting the present invention.

It is therefore an object of the invention to provide a hydraulic brake for heavy duty applications which combines the features of effectiveness, reliable performance and low cost.

Another object of the invention is to realize increased braking effectiveness in one direction of vehicle motion.

Another object of the invention is to obtain an adjustable brake of increased strength which is adapted to be self-energizing with respect to the brake drum.

Another object of the invention is to provide improved anchorage for the brake by novel location of the torque-taking member within the wheel cylinder.

A still further object of the invention is to provide improved means for laterally positioning the shoes in operative position.

The above and other objects and features of the invention will appear more fully hereinafter from a consideration of the following description, taken in connection with the accompanying drawings, wherein a plurality of embodiments of the invention are illustrated by way of example.

Figure 4:
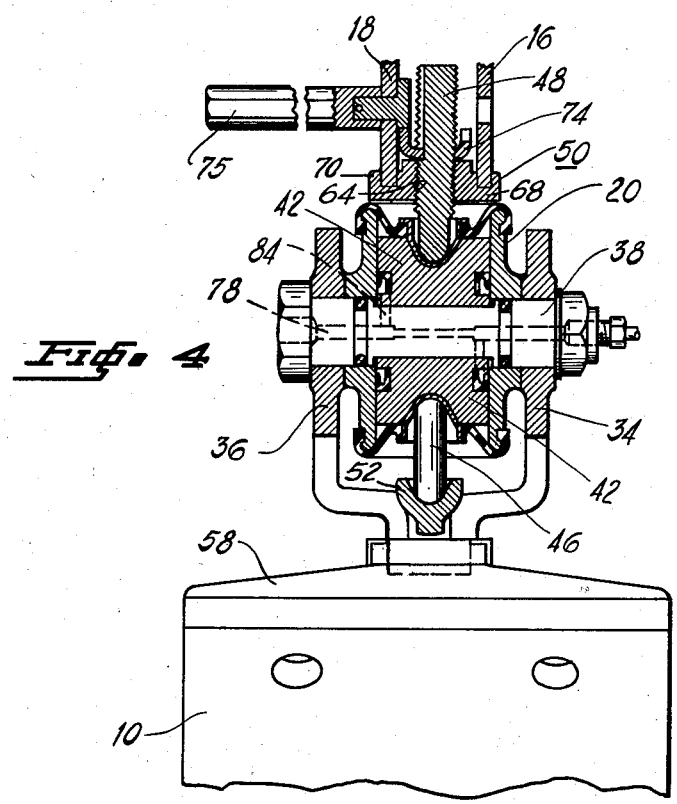
Figure 4 is a section view taken along the axis of the wheel cylinder and through the shoe applying mechanism on the line 4—4 of Figure 1.
Figure 5:
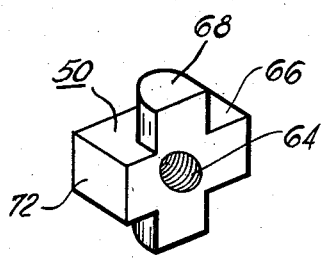
Figure 5 illustrates in perspective the adjustor adapted for use with the brake illustrated in Figures 1 to 4.
Figure 6:
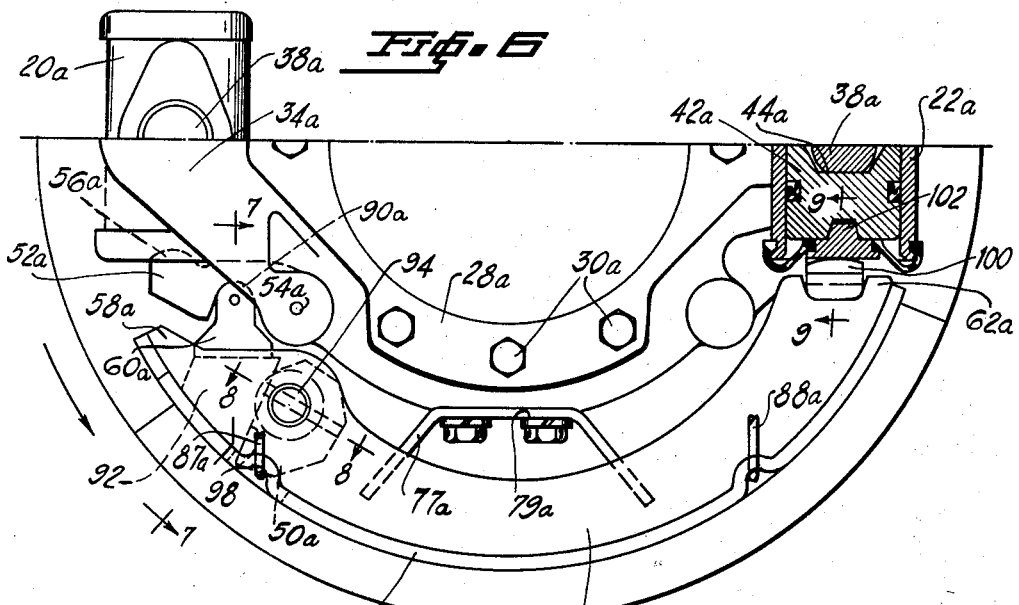
Figure 7:
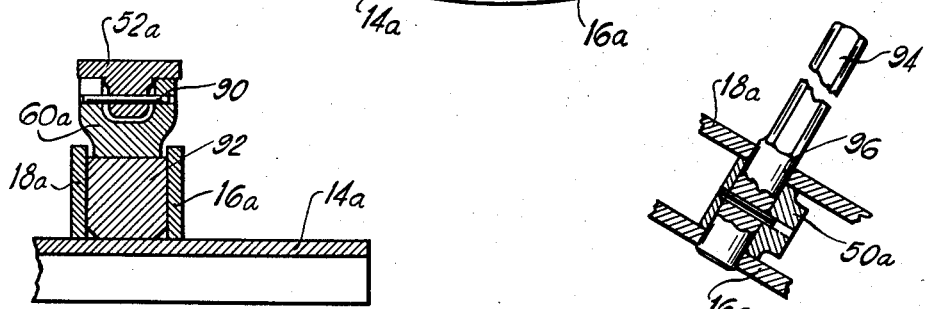
Figure 8:
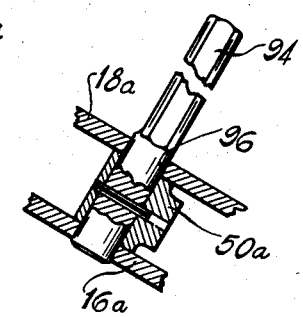
Figure 9:
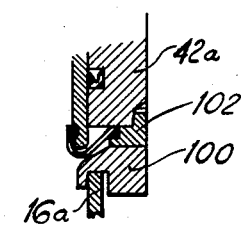

Figure 6 is a fragmentary view in side elevation of a further embodiment of the invention disclosing certain modifications of the brake illustrated in Figures 1 to 5; and Figures 7, 8, and 9 are section views taken respectively on the lines 7—7, 8—8, and 9—9 of Figure 6.

Referring to the embodiment disclosed in Figures 1 to 5, a pair of brake shoes 10 and 12, each having a friction material lined rim 14 and transverse strengthening webs 16 and 18, are hydraulically actuated by a pair of wheel cylinders 20 and 22 into engagement with a rotatable drum 24 mounted on anti-friction bearings positioned on a fixed member such as the axle 26.

A torque spider 28 is suitably secured by a plurality of fastening members 30 to a fixed member, such as axle housing flange 32, and is provided with radially extending projections 34 and 36 which are offset to extend on either side of the wheel cylinders 20 and 22 thereby securing them in operative position.

An anchor pin 38 is received through the mid portion of each of the wheel cylinders 20 and 22 and is secured on either side to the projections 34 and 36 of the support plate 28.

Reciprocably mounted in each of the wheel cylinders 20 and 22 are a pair of oppositely acting pistons 42 having centrally located recesses 44 on adjacent ends thereof bearing against anchor members 38. Operatively associated with each of the pairs of pistons 42 are thrust links 46 and 48. The thrust link 48 is threadedly received in an adjusting mechanism designated generally by reference numeral 50. An applying lever 52 associated with one end of each of the shoes is pivoted at 54 and actuated by thrust link 46 at opposite end 56. Shoe ends 58, applied by levers 52, abut the latter intermediate the applied and pivoted ends thereof to multiply the actuating force exerted by the wheel cylinder on the end of the shoe associated therewith. Woodruff keys 60 are interposed between the levers 52 and the ends 58 of the shoes to permit pivotal and sliding movement of the shoes on levers 52.

The other end 62 of shoes 10 and 12 is operatively connected to the piston 42 through adjustor 50. The adjustor 50 consists of thrust link 48 threadedly received in opening 64 in an adjustor block 66 (Figures 4 and 5). The adjustor block 66 is provided with a post 68 which is positioned in a recess 70 in the end 62 of the brake shoe. Arm 72 of adjustor block 66 is fitted between the webs 16 and 18 of the respective shoes thereby preventing the anchor block 66 from turning with the threaded link 48 when the latter is caused to rotate by crown wheel 74 meshing with star wheel 76.

The shoes 10 and 12 are free to pivot about end 62 by reason of the convex shape of post 68 and the mating recessed portion in the webs 16 and 18 of the shoes.

To laterally position the shoes 10 and 12, I provide shoe guiding means consisting of bands 77 which are secured to the torque spider 28 at points 79. The bands 77 are received between the webs 16 and 18 of the respective shoes and abut on either side with the inner portion of the webs of shoes 10 and 12. This abutting relation of the bands 77 with the webs 16 and 18 of the respective shoes prevents movement of the shoes in either lateral direction and also prevents lateral turning of the shoes about ends 58 and 62.

Each of the anchor members 38 constitutes part of the hydraulic system. The anchors 38 are provided with centrally located, longitudinally extending passages 78 communicating with chambers 84 in wheel cylinders 20 and 22. External conduit 86 communicates the chambers 84 in wheel cylinders 20 and 22.

A pair of return springs 87 and 88 interconnect the two shoes 10 and 12 on either side of the torque spider 28 to yieldably retain the shoe ends 58 and 62 in retracted position.

Referring now to the embodiment disclosed in Figures 6 to 9, parts corresponding to those previously mentioned will be referred to by the same reference numeral with the subscript *a* affixed thereto.

A pair of brake shoes each having a friction material lined rim 14*a* and transverse strengthening webs 16*a* and 18*a* are hydraulically actuated by wheel cylinders 20*a* and 22*a* into frictional engagement with a rotatable drum (not shown). A torque spider 28*a* is suitably secured by fastening members 30*a* to a nonrotatable member, such as an axle flange. The torque spider 28*a* is provided with axially offset projections 34*a* and 36*a* extending on either side of wheel cylinders 20*a* and 22*a*.

Anchors 38*a* are transversely received through openings provided in the mid portion of the wheel cylinders 20*a* and 22*a*. The anchors 38*a* are positioned at opposite ends in the axially offset projections 34*a* and 36*a*. Reciprocably received in each of the wheel cylinders 20*a* and 22*a* are a pair of oppositely acting pistons 42*a*, the adjacent ends of which are recessed at 44*a* and abut with the anchor 38*a*. Each of the shoes is adapted for pivotal and sliding movement about either of their opposite ends 58*a* and 62*a*, thus permitting the shoe to maintain concentricity with the rotatable drum 24*a* and further permitting pivotal actuation of the shoe about either of the opposite ends thereof.

One end 58*a* of each of the shoes 10*a* and 12*a* is provided with a lever 52*a* at 54*a* and actuated by input force supplied by the piston at 56*a*. A key 60*a* having pinned connection 90 with lever 52*a* abuts with a block insert 92 which is positioned between the webs 16*a* and 18*a* at the end 58*a* of each of the shoes 10*a* and 12*a*. This arrangement of parts permits each of the shoes 10*a* and 12*a* to pivot about pinned connection 90 and further allows the shoe to shift by sliding action between the block insert 92 and key 60*a*.

A polygonal adjustor 50*a* mounted on a stem 94 which is journaled at points 96 in webs 16 and 18*a* is in abutting relation with a side 98 of the block insert 92. This abutting relation of the polygonal adjustor with the side 98 of the block insert 92 defines the extent of retraction of the shoe end 58*a* associated therewith.

Each shoe is positioned laterally by a band 77*a* suitably secured to the torque spider 28*a* at points 79*a*. The ends of the band 77*a* project within the space between the strengthening rims 16*a* and 18*a* of brake shoes 10*a* and 12*a*. The width of the band 77*a* is approximately equal to the distance between the two webs 16*a* and 18*a*, and the band 77*a* accomplishes lateral positioning of the shoes by abutting contact with opposite inner surfaces of the two webs 16*a* and 18*a*.

Inserted between the end 62*a* of the shoes 10*a* and 12*a* and the piston 42*a* is a key 100 having a slightly convex face contacting a hardened insert 102 which is received in the outer end of the piston 42*a*. The purpose of the slightly convex shape of the one end of key 100 is to permit pivotal movement of the shoe about end 62*a*.

The operation of the embodiment shown in Figures 1 to 5 is as follows:

Hydraulic pressure from a master cylinder source (not shown) is transmitted through passage 78 in anchor 38 to chamber 84 in wheel cylinder 20. As the pistons 42 are spread apart under the action of the fluid pressure transmitted thereto, the two wheel cylinders 20 and 22 are intercommunicated by way of external conduit 86 effecting simultaneously the same operation. When the pistons 42 in each of the cylinders 20 and 22 are spread apart, a greater applying effort is exerted on end 58 of each of the shoes 10 and 12 because of the multiplying lever 52. This means that with a given input force in the wheel cylinder, the shoe end 58 will be applied more readily against the rotating drum 24.

Figure 1:
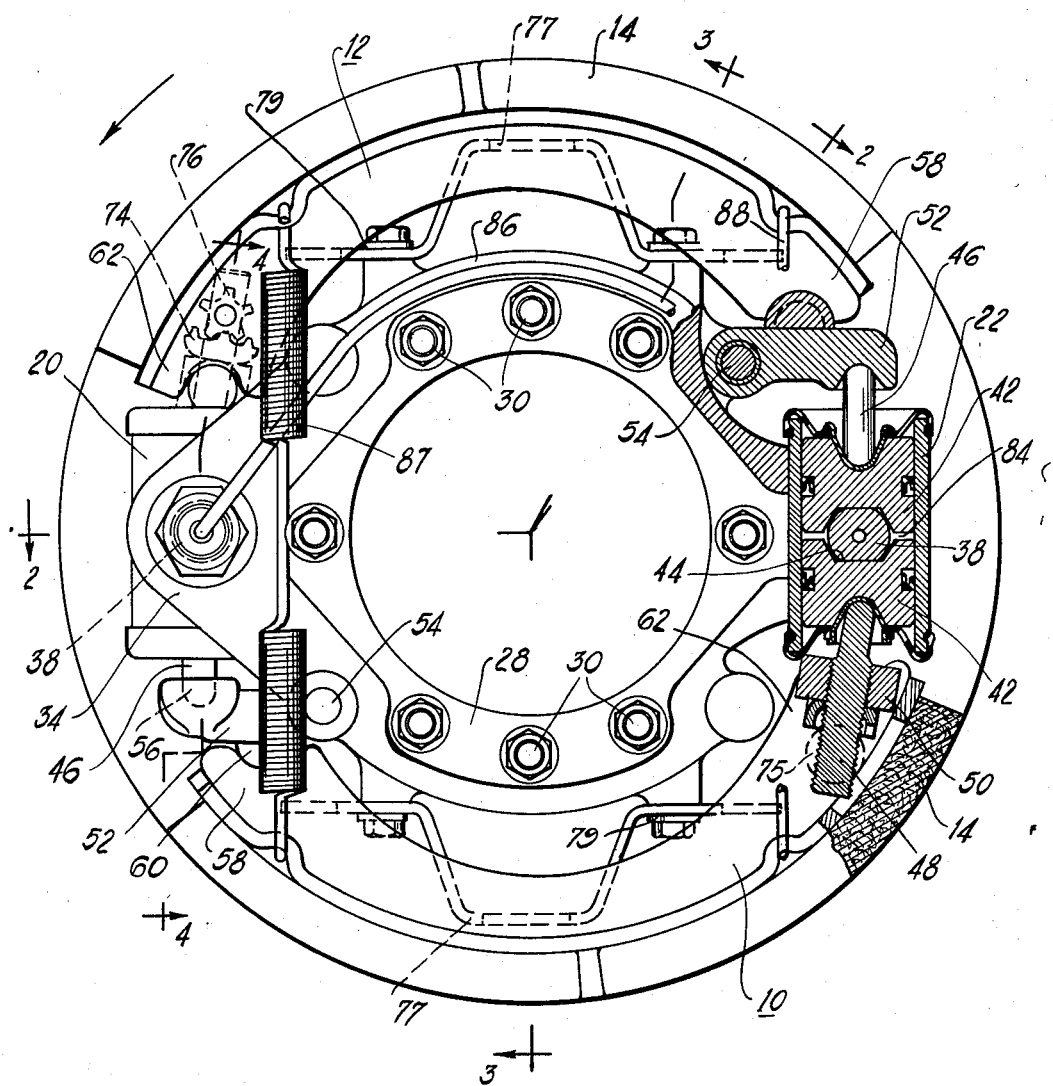
Figure 1 is a side elevation of the brake assembly illustrating in partial section the wheel cylinder, adjustor, applying lever, and a portion of the torque spider.
Figure 2:
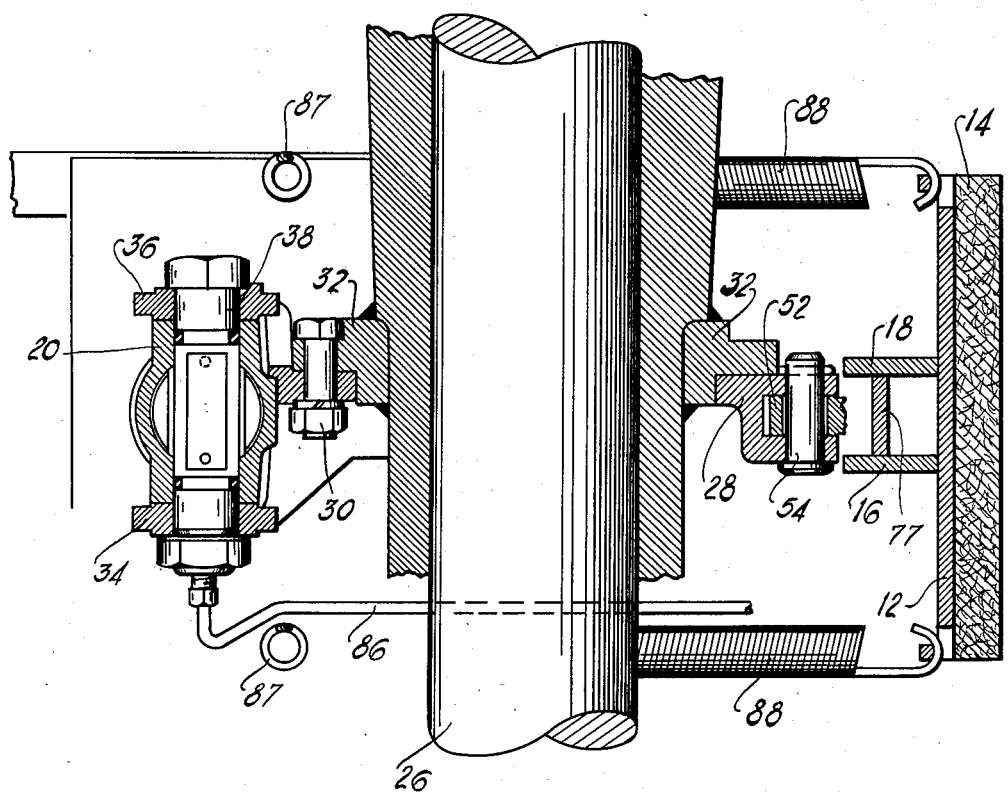
Figure 2 is a section view taken through one of the wheel cylinders on line 2—2 of Figure 1.
Figure 3:
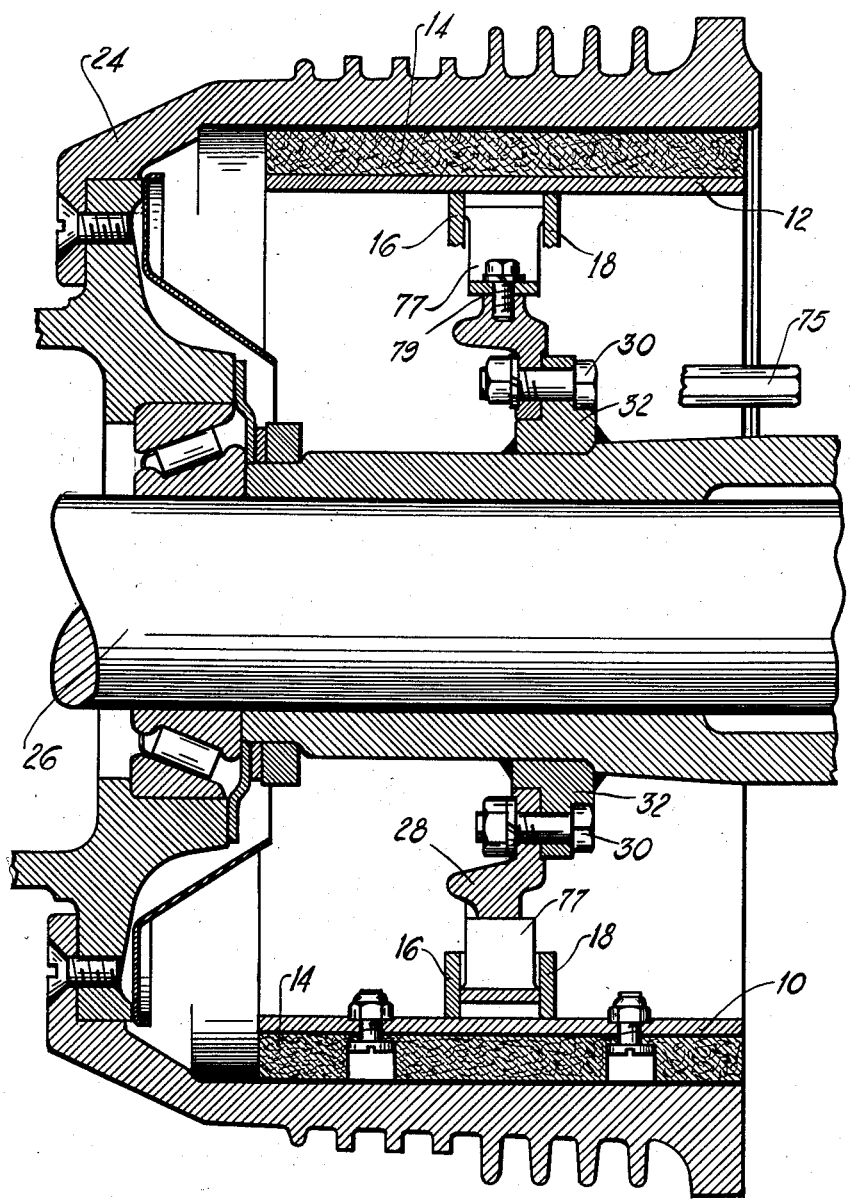
Figure 3 is a section view taken on the line 3—3 of Figure 1.

Assuming a direction of drum rotation in the direction indicated in Figure 1, the two shoes will anchor at their respective ends 62 on adjustors 50; the anchoring load is then transmitted through pistons 42 to the anchors 38. It will be noted that anchoring load is transmitted to anchors 38 independently of wheel cylinders 20 and 22. The only torque reaction which is exerted on wheel cylinders 20 and 22 is that causing a slight turning of the wheel cylinder about anchor 38 due to the slight angle of contact between the threaded thrust link 48 and the piston associated therewith. The tendency of the wheel cylinder to twist under the action of a part of the anchoring load is compensated for by contact of the flat sides of the wheel cylinder with the torque spider 28. Substantially all of the anchoring load is transferred directly to the anchor independently of the wheel cylinders 20 and 22.

When the braking effort exerted by the operator is released the two pairs of return springs 87 and 88 associated with the ends 58 and 62 of the shoes 10 and 12 return them to retracted position.

Assuming now opposite direction of drum rotation, operator generated pressure will spread the pairs of pistons in each of the wheel cylinders 20 and 22 apart, applying first shoe end 58 and then shoe end 62. Shoe end 58 is returned to retracted position and the shoe anchors thereagainst. The anchoring load is transmitted through lever 52 to the anchor 38 via the piston 42 associated therewith. The anchoring load is transmitted to the anchor 38 independently of the wheel cylinders 20 and 22, excepting a slight tendency to turn the wheel cylinder about the anchor which is compensated for by the flat characteristic of the side of the wheel cylinder contacting the torque spider 28. When the input force on the pistons is released the pair of return springs 87 and 88 return the shoe ends 62 to retracted position.

When the lining on the shoes has worn sufficiently to necessitate an adjustment, the stem 75 is rotated by a suitable tool inserted through an opening in the brake assembly which causes turning of star wheel 76 meshing with crown wheel 74. Turning of stem 75 ultimately produces rotation of the threaded thrust link 48 in the threaded opening 64 of the adjustor block 66 so that the adjustor block 66 is caused to move away from the wheel cylinder spreading the end of the shoe 62 and varying the retracted position thereof. When the end of the shoe 62 is adjusted outwardly, concentricity of the shoe with the drum is re-established by sliding of the shoe on ends 58 and 62 causing the shoe to shift along a line connecting the opposite ends thereof.

It will be noted that as the torque reaction from braking is transmitted to the anchor 38 the anchoring load is communicated to projections 34 and 36 equidistant from the center portion of the torque spider 32. This is what is known as centermount principle, the purpose of this construction is to eliminate any lever arm through which the anchoring load can be multiplied in being transmitted to a fixed member, so that the brake construction can absorb greater torque loads for a given size of the components.

The operation of the brake illustrated in Figures 6 to 9 is substantially the same as that in the previous embodiment, differences in operation of the two devices are related to the adjustment feature and in the manner in which braking torque is transmitted through the pistons 42*a* to the anchor 38*a*.

Assuming rotation in the direction indicated in Figure 6 the two shoes anchor at shoe end 62*a*. The webs 16*a* and 18*a* contacting the key 100 transmit the torque reaction to the anchor 38*a* via the piston associated therewith. The contacting point between the key 100 and the plug 102 permits pivotal movement of the shoe as end 58*a* is outwardly applied against the drum. The shoe end 58*a* is applied by lever 52*a* acting through the key 60*a* abutting with block 92.

The shoe is adjusted by rotating the stem 94 which turns the polygonal adjustor 50*a* bringing an adjacent side into abutting contact with the block 92. The polygonal adjustor is so designed that successive adjacent sides are farther removed from the center of rotation of the adjustor and, as the distance between the block 92 and the stem 94 is increased, the stem 94 abutting with the two webs 16a and 18a causes outward movement of shoe end 58a. When the shoe 58a is adjusted outwardly concentricity of the shoe and drum 24a is re-established by shifting movement of the shoe as it slides on ends 58a and 62a.

Although only two embodiments of the invention have been described it will be apparent to those skilled in the art that various changes in design and location of the parts may be made without departing from the scope of the invention.

I claim:

1. A brake comprising a torque spider, a pair of individually self-energizing brake shoes each having a rim and two transverse strengthening webs, a fluid motor mounted between each of the adjacent ends of said shoes and operatively connected therewith, axially offset projections of said torque spider extending on either side of said wheel cylinders, an anchor pin laterally received through the midportion of each of said wheel cylinders and positioned in said projections, shoe positioning means clamped to said torque spider and received between the transverse webs on said shoes, a pivoted applying lever associated with one end of each of said shoes, a thrust link operatively connected to the end of each of said levers, means for enabling the ends of said shoes associated with said levers to slide and pivot on said levers intermediate the ends thereof, an adjustor associated with one end of each of said shoes consisting of a post positioned in the webs of said shoes to permit pivotal movement of said shoes thereon, a boss located on the midportion of said post and positioned between the webs of said shoes to prevent turning of said adjustors, and an externally threaded thrust link received in an opening in each of said adjustors, said thrust links bearing against pistons in said fluid motors and adapted to vary the retracted position of the ends of the shoes associated therewith.

2. A brake comprising a torque spider, a pair of individually self-energizing brake shoes each having a rim and two transverse strengthening webs, a pair of fluid motors located between adjacent ends of said shoes, a laterally extending anchor pin transversely received through each of said fluid motors, axially offset projections integral with said torque-taking member and extending on either side of said fluid motors, said anchoring pins being received through said fluid motors and positioned at opposite ends thereof in said projections, a pivoted applying lever operatively interconnected between an opposite end of each of said shoes and said fluid motor, the end of said shoe associated therewith being adapted for sliding and pivotal movement thereon, an adjustor associated with the other ends of said shoes, each of said adjustors having a portion received between the strengthening webs of the shoe and a post received in the webs of the shoe end to perimt pivotal movement of the shoe thereon, a threaded thrust link received in an opening in said adjustor and operatively connected to said shoes through said adjustor, meshing star wheels adapted to produce turning of said threaded stem to vary the retracted position of the end of the shoe associated therewith, means received between the webs of said shoes and in abutment therewith for laterally positioning said shoes, and means for yieldably retaining said shoes in retracted position.

3. A brake comprising a torque taking spider, a pair of brake shoes each having a rim and two transverse strengthening webs, a fluid motor with openings in the casing thereof, said openings being constructed perpendicularly to the longitudinal axis of the fluid motor, said fluid motor being associated with each of the adjacent ends of said shoes, a pivoted applying lever associated with an opposite end of each of said shoes and operatively connected to said fluid motor, each of said shoes being adapted for pivotal and sliding movement on said applying levers, axially spaced projections on said torque spider extending on either side of said fluid motors to provide support therefor, anchor members transversely received through the openings in said wheel cylinders, said anchor members being mounted and taking support at each of the opposite ends thereof in said projections, each of said anchor members having longitudinal passages communicating hydraulic fluid pressure to said fluid motors, and a conduit interconnecting the passages in said anchors for imparting simultaneous applying effort on the shoe ends associated with said fluid motors.

4. For use in combination with a pair of arcuate brake shoes, a fluid motor associated with each of the adjacent expansible ends of said shoes, a pair of oppositely-acting pistons reciprocably received in each of said fluid motors, a pair of thrust links positioned in the remote ends of each of said pair of pistons and operatively connected to adjacent shoe ends, an anchor member transversely received through aligned apertures in said fluid motors and taking support at each end in torque-taking projections extending on each side of said fluid motors, means for sealing said apertures in the fluid motor which receive said anchors, said pistons bearing against said anchor member to define the retracted position of the shoe ends associated therewith, and transmitting torque thereto as the shoe anchors thereagainst.

5. In a brake a fluid motor associated with each of a pair of adjacent expansible shoe ends, two oppositely-acting pistons reciprocably mounted in said fluid motors, an anchor member transversely received through openings in each of said fluid motors, each of said anchor members being supported at opposite ends thereof independently of the associated fluid motor, hydraulic passage means formed in said anchors to transmit fluid pressure to the associated fluid motor, the openings in said fluid motor which receive said anchors being sealed against fluid leakage and thrust links operatively interconnecting said pistons and the expansible ends of said shoes, said pistons engaging said anchor to define the retracted position of said shoes and anchoring thereon as braking torque is transmitted thereto by the shoe ends bearing thereagainst, said fluid motor being prevented from turning about said anchor by engagement of one side of the fluid motor with a fixed member.

6. A fluid motor which is constructed and arranged to apply adjacent expansible ends of a pair of shoes associated therewith, said fluid motor including a pair of oppositely-acting pistons reciprocably mounted therein, and an anchor transversely received through openings which are constructed transversely in said wheel cylinder, said pistons abutting said anchor and transmitting torque thereto independently of said wheel cylinder as the shoe ends anchor through said pistons, said anchor being constructed as a part of the hydraulic system to introduce fluid pressure to said wheel cylinder via a longitudinally extending bore provided therein.

7. In a brake, a brake shoe provided with a plurality of transverse strengthening webs, an actuatable thrust link operatively associated with an actuating means, and an adjustor threadedly received on said link, said adjustor having a first portion which is received between the webs of said shoe and is proportioned to be locked therebetween to prevent relative turning of said first portion with respect to the strengthening webs, and a second portion of said adjustor which is constructed integrally with said first portion and is received within notches of the brake shoe to enable pivoting movement thereon, said adjustor being in abutting relation with said shoe to impart a spreading force thereon as said thrust link is caused to turn in one direction.

8. In combination with a pair of brake shoes, a fluid motor associated with each of the adjacent expansible ends of said shoes, a pair of oppositely-acting pistons reciprocably received in each of said fluid motors and operatively connected to adjacent ends of the shoes, and an anchor extending through aligned sealed apertures constructed in said wheel cylinders, said anchors being supported at opposite ends thereof independently of said fluid motors, the pairs of pistons bearing against said anchors to define the anchored and retracted position of said brake shoes.

9. A fluid motor including a pair of pistons adapted to apply adjacent expansible ends of a pair of brake shoes, and an anchor transversely extended through and substantially filling aligned sealed openings in the midportion of said fluid motor, said pistons engaging said anchor and transmitting torque thereto, said anchor being provided with a longitudinal passage affording hydraulic inlet to and exit from said wheel cylinder in actuating said pistons to apply the shoes associated therewith.

10. In a brake, a nonrotatable member, an anchor member, a fluid motor including a cylinder casing having transverse openings in the sides thereof, said anchor member being received through said openings in said casing to become constructed and arranged for mounting said fluid motor on said nonrotatable member, means for sealing said transverse openings which receive said anchor members therein and a pair of brake shoes arranged to transmit torque reaction to said anchor member independently of the cylinder casing of the fluid motor.

11. In a brake, a fluid motor, anchoring means which are constructed separately in said motor and are received through transverse openings in a part of said fluid motor for mounting it on a fixed member, and a pair of brake shoes arranged to transmit thrust to said anchoring means independently of the cylinder of said fluid motor.

12. A heavy duty hydraulic brake comprising a fixed torque spider, a pair of brake shoes having adjacent expansible ends, each of said brake shoes having an arcuate friction-material-lined rim and a plurality of spaced-apart strengthening webs, lateral positioning means for said shoes combined with said torque spider and said strengthening webs, hydraulic wheel cylinders carried by said torque spider and located between the adjacent expansible ends of said shoes, thrust links combined with said wheel cylinders at each end thereof, oppositely located applying levers each pivotally mounted at one end on said torque spider and swivably connected to a thrust link at its other end, said levers being arranged to transmit applying thrust to the ends of the shoes at a point on the lever intermediate the pivotal mounting portion and operative connection with the thrust link while providing for both pivotal and sliding movement of said shoes, means arranged to receive the anchoring load of the shoes substantially independently of the wheel cylinders, each of said levers serving to transmit the anchoring load of a shoe to said anchoring means during braking in one direction, and adjustor means combined with one end of each of said shoes for varying the retracted position thereof while maintaining a substantially constant piston displacement in said wheel cylinders.

References Cited in the file of this patent

UNITED STATES PATENTS

| Number | Name | Date |
|---|---|---|
| 1,872,197 | VanBuskirk | Aug. 16, 1932 |
| 1,957,635 | Evans | May 8, 1934 |
| 2,063,618 | Oliver | Dec. 8, 1936 |
| 2,218,201 | Lapwood | Oct. 15, 1940 |
| 2,253,205 | Eksergian | Aug. 19, 1941 |
| 2,329,095 | White | Sept. 7, 1943 |
| 2,322,121 | Frank | June 15, 1943 |
| 2,424,655 | Goepfrich | July 29, 1947 |
| 2,475,491 | Goepfrich et al. | July 5, 1949 |
| 2,548,044 | Neale | Apr. 10, 1951 |
| 2,569,012 | Laurer | Sept. 25, 1951 |
| 2,664,973 | Colley | Jan. 5, 1954 |